UNITED STATES PATENT OFFICE.

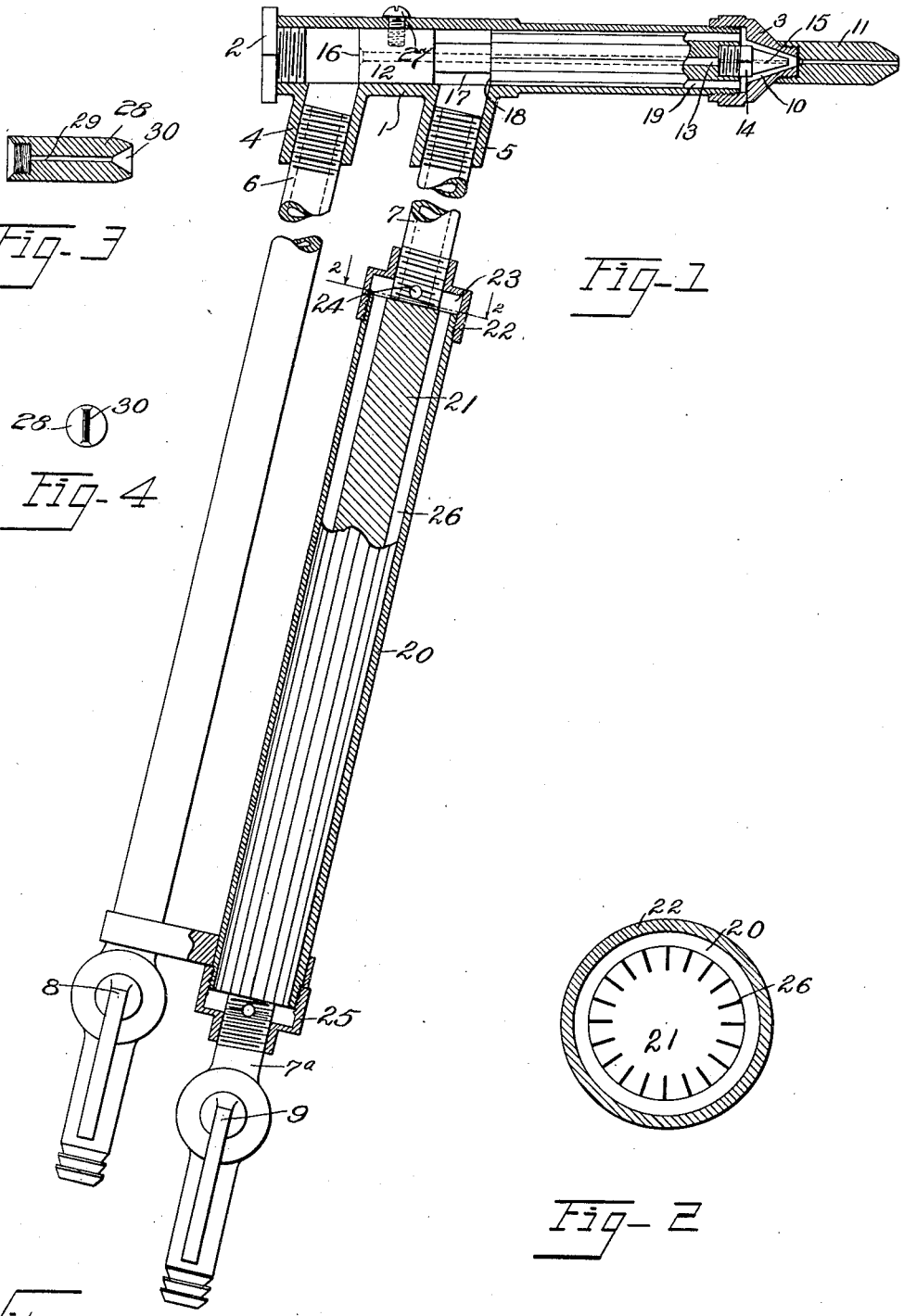

JOHN HARRIS, OF CLEVELAND, OHIO, ASSIGNOR TO CAROLINE A. HARRIS, OF CLEVELAND, OHIO.

BLOWPIPE.

No. 920,054.      Specification of Letters Patent.      Patented April 27, 1909.

Application filed December 17, 1908. Serial No. 468,052.

*To all whom it may concern:*

Be it known that I, JOHN HARRIS, a citizen of the United States, residing at Cleveland, in the county of Cuyahoga and State of Ohio, have invented a certain new and useful Improvement in Blowpipes, of which the following is a full, clear, and exact description, reference being had to the accompanying drawings.

This invention relates to burners of the blow-pipe type, and more especially to oxy-acetylene blow pipes.

The general objects of the invention are to provide a blow pipe in which oxygen and acetylene may be burned to produce a flame of intense heating capacity suitable for various purposes in the arts, such as so-called "autogenous welding," and which will admit of the employment of acetylene under a pressure greatly lower than has heretofore been considered practicable, without any danger of "lighting back" of the mixture within the blow pipe or within the acetylene supply conduit leading thereto.

A further object of the invention is to provide a blow pipe of this type which shall possess a wide range of capacity, enabling it to satisfy the incidents of use which occur in the various arts in which such pipes may be employed.

With the foregoing general objects in view, the invention may be further and generally defined as consisting of the combinations of elements embodied in the claims hereto annexed and illustrated, in one modification, in the drawings forming a part hereof, wherein—

Figure 1 represents a central longitudinal sectional view of a blow pipe constructed in accordance with my invention, certain parts being shown in elevation; Fig. 2 represents a sectional detail corresponding to the line 2—2 of Fig. 1; and Figs. 3 and 4 represent respectively a longitudinal sectional view and a front elevation of a special form of tip which may be employed with the blow pipe.

Describing by reference characters the parts shown in the drawings, 1 denotes the blow pipe casing, the same comprising a hollow body provided with a cylindrical bore and threaded internally at its rear end for the reception of a plug 2 and threaded externally at its front end for the reception of a nozzle 3. The casing 1 is provided with connections 4 and 5, preferably integral therewith, said connections being threaded for the reception of the conduits 6 and 7 respectively. Connection 4 projects from the rear end of the casing 1 and communicates with a chamber formed in the rear portion of said casing immediately in front of the plug 2. Connection 5 projects from a portion of the casing 1 in front of connection 4. The conduit 6 is provided with a valve 8 and is employed for the purpose of supplying oxygen under pressure to the chamber at the rear of the blow pipe casing. Conduit 7 is for the purpose of supplying acetylene to said casing and has therein means whereby the "lighting back" or propagation of flame is prevented, without at the same time unduly decreasing the supply of such gas to the burner. The acetylene supply conduit is provided with a valve 9.

The nozzle 3 is provided with a conical bore 10 extending to the front or discharge end thereof and has such front end preferably cylindrical in outline and provided with an external thread for the purpose of conveniently applying to and removing therefrom the tip 11. It will be observed that the bore of tip 11 shown herein is considerably smaller than the discharge end of bore 10, such discharge end being of sufficient area to supply the maximum quantity of oxygen and acetylene for which the pipe is adapted. By substituting tips having larger or smaller bores than the one shown in tip 11, the volume of flame produced may be correspondingly varied without reference to the valves 8 and 9.

Within the bore of the casing 1 there is fitted a plug 12, said plug being provided with a central bore 13 extending therethrough. At its front end, the plug 12 is provided with an internally threaded recess to which there is removably fitted a nozzle 14, said nozzle being provided with a bore 15 communicating with the bore 13. For convenience of construction, bore 13 can be made larger than is necessary under ordinary conditions of use of the blow pipe, the effective discharge of fluid through said bore being controlled by the bore 15 and the valve 8. The front end of nozzle 14 is tapered or frusto-conical and forms, with the bore 10 of nozzle 3, a restricted passageway for acetylene into the mixing chamber provided in the nozzle and in the tip. Plug 12 is driven into the casing 1 and forms a tight fit therewith, the portion of said plug which is interposed between the connections 4 and 5 serving to block communication between the oxygen in the chamber 16 at the rear of said plug and the acetylene supplied to said casing. Where the connection 5 merges with the casing, the plug is provided with an annular recess 17 between a pair of shoulders located on opposite sides of said connection. That portion of the plug extending forwardly from the shoulder 18 is provided with a suitable number of narrow longitudinal slots 19, communicating at one end with the recess 17 and at the other end with the interior of the nozzle 3 and the mixing chamber. As will appear from Fig. 1, the recess 17 is of sufficient depth to provide suitable depth and capacity for the narrow slots 19. As a plug having similar slots is employed in the acetylene supply pipe and is illustrated in detail herein, further reference to the slots in the plug 12 is unnecessary at this time, as said slots will be described fully by a description of the slots in the latter plug.

The acetylene conduit comprises a casing 20 to the opposite ends of which are connected pipe connections communicating on the one hand with the burner casing and on the other hand with the source of supply. Within the casing 20 there is closely fitted, as by means of a driving fit, a plug 21. This plug except as to length and diameter, is substantially identical with that portion of plug 12 extending from recess 17 to nozzle 3. The pipe connection extending from the blow pipe casing is detachably connected to the casing 20 by means of a connection 22, which is threaded onto the adjacent ends of said casing and connection and forms a leak-proof between the pipe connection and the casing, a chamber 23 being provided within said connection 22 beyond the adjacent end of the plug 21. The end of the pipe connection 7 projects into said chamber and abuts against the plug 21 and such end is provided with a suitable number of apertures 24 within said chamber and establishing communication between said chamber and the pipe connection 7. A similar connection 25 is provided between the opposite end of the casing 20 and the supply pipe connection 7ª communicating therewith. The plug 21 is provided with a series of slots 26 extending from end to end thereof, said slots projecting radially inwardly from the outer surface of said plug. These slots communicate at their opposite ends with the chambers formed in connections 22 and 25. These slots, as well as the slots 19 in plug 12, are preferably of the width of 36-gage metal, although slots of the width of 34-gage metal will answer the purpose, and are designed for the purpose of preventing the "lighting back" or propagation of flame within the blow pipe and the acetylene supply conduit.

To retain the plug 12 in operative relation to the other parts of the blow pipe, I employ a set screw 27 which extends through the casing 1 and is threaded into the plug.

In Figs. 3 and 4 I have shown a special form of tip which may be employed for the production of a short but wide and flat flame. The tip, shown at 28, is provided with a longitudinal bore 29, which bore is flared outwardly at its outer end, as shown at 30. This construction of tip provides a shorter flame than does a tip such as shown in Fig. 1, with a larger heating surface.

In operation, the oxygen and acetylene are turned onto the blow pipe by means of the valves 8 and 9 and the mixture is ignited at the end of tip 11. With the construction of plugs employed herewith, it will be practically impossible for the flame to "light back" through the slots 19 in the plug 12, but even should such action occur, the provision of the plug 21 with its slots 26 will prevent further propagation of flame.

A very important feature of my invention is that, by the slot construction shown herein, a large aggregate area of acetylene supply is provided, but the restriction at individual points by means of the slots will effectively prevent the propagation of flame or "lighting back," even when operating under pressures of acetylene much lower than it has been considered heretofore profitable to employ. For instance, I am enabled to employ with the type of blow pipe shown herein acetylene under pressures from 25/10 up and oxygen under a pressure of from 5 pounds down. Furthermore, the peripheral discharge of the acetylene into the interior of nozzle 3 supplies it to the mixing chamber in an especially suitable condition to be acted upon by and be commingled with the oxygen. A complete and homogeneous mixture is discharged from the pipe and perfect combustion is obtained at a temperature which will enable so-called "autogenous welding" to be accomplished. Furthermore, owing to the large aggregate area provided for the acetylene, I am enabled to obtain a larger flame and larger variations in flame than have heretofore been obtained by blow pipes of this character.

Having thus described my invention, what I claim is:

1. In a blow pipe, the combination of a casing having therein a plug extending from the front to the rear portion of the casing and forming with such rear portion of the casing a chamber, said plug having a central bore extending therethrough and having an annular recess in the outer surface thereof between the rear and the front end thereof, a supply connection communicating with the part of said casing containing said recess, said plug being provided with a plurality of narrow slots extending from said recess to the front end thereof, and a nozzle carried by said casing and adapted to receive the fluids discharged through said bore and through said slots.

2. In a blow pipe, the combination of a casing having a substantially cylindrical bore extending from end to end thereof, a nozzle carried by the front end of said casing, a plug for the rear portion of said casing, a gas supply connection carried by said casing near the rear portion thereof and in front of said plug, a second gas supply connection carried by said casing between the front and the rear end thereof, and a plug fitting said casing closely and extending rearwardly between said connections and having a central bore therethrough and having adjacent to the second connection an annular recess, said plug being provided with narrow longitudinal slots extending inwardly from the circumference thereof and extending from said recess toward the front end of the plug.

3. A blow pipe comprising, in combination, a casing having at the front end thereof a nozzle, said nozzle having a tapered bore forming a chamber, a plug in said casing having a tapered nozzle projecting into the bore of the former nozzle, said plug being provided with a plurality of narrow radial slots extending inwardly from the periphery thereof and restricted in width to prevent the passage of flame therethrough and said plug having a bore extending therethrough and through the tapered nozzle thereof, the front ends of said slots communicating with the chamber in the first-mentioned nozzle, and a pair of connections for said casing, one of said connections communicating with the central bore of the plug and the other communicating with said slots.

4. A blow pipe comprising, in combination, a casing having at the front end thereof a nozzle, said nozzle having a tapered bore forming a chamber, a plug in said casing having at its front end a recess, a nozzle fitted into said recess and projecting into the chamber, said plug being provided with a plurality of narrow radial slots extending inwardly from the periphery thereof and restricted in width to prevent the passage of flame therethrough and said plug having a central bore extending therethrough and through the nozzle thereof, the front ends of said slots communicating with the chamber in the first-mentioned nozzle, and a pair of connections for said casing, one of said connections communicating with the central bore of the plug and the other communicating with said slots.

5. A blow pipe having, in combination, a casing, a mixing chamber, a plug extending longitudinally of said casing and provided with a plurality of narrow longitudinal slits communicating at one end with said casing and at the opposite end with said chamber and restricted in width to prevent the passage of flame therethrough, means for supplying a gas through said slits to said mixing chamber, and a conduit for supplying another gas to said chamber.

6. A blow pipe comprising in combination a casing having a nozzle provided with a tapered bore forming a chamber, a plug fitting said casing tightly and provided with a plurality of radial narrow longitudinal slits communicating at one end with said chamber and restricted in width to prevent the passage of flame therethrough, said plug having a tapered nozzle projecting centrally into the former nozzle, said plug being provided with a central bore or conduit extending therethrough and through the latter nozzle, and connections for supplying a gas through the bore of said plug and for supplying a second gas through the longitudinal slots thereof.

7. A blow pipe comprising in combination a casing having a nozzle provided with a tapered bore forming a chamber, said nozzle having an externally threaded end, a plug in said casing provided with a plurality of narrow longitudinal slits communicating at one end with said nozzle and itself having a tapered nozzle projecting centrally into the former nozzle, said plug being provided with a bore or conduit extending therethrough and through the latter nozzle, connections for supplying a gas through the bore of said plug and for supplying a second gas through the longitudinal slots thereof, and a tip threaded onto the threaded end of the first-mentioned nozzle.

8. The combination, with a burner having a discharge outlet, of a gas supplying conduit communicating with said outlet, said conduit comprising a plug fitted closely within a casing, said plug being provided with a plurality of narrow radial longitudinal slits extending from end to end thereof and projecting inwardly from the periphery of said plug and restricted in width to prevent the passage of flame therethrough.

9. The combination of a blow-pipe casing having a fluid fuel conduit therein, said conduit comprising a member in said casing having a plurality of longitudinal slots therein, said slots being of a width not exceeding the thickness of 34-gage metal, and means for supplying gas through the slots in said member.

10. The combination, with a burner having a discharge outlet, of a fluid fuel conduit communicating with said outlet, said conduit comprising a member having a plurality of longitudinal slots therein for the passage of gas, said slots being of a width not exceeding the thickness of 34 gage metal.

11. The combination, with a burner, of a fluid fuel conduit, said conduit comprising a casing having fitted closely thereinto a plug and said plug being provided with a plurality of narrow longitudinal slots extending from end to end thereof and projecting inwardly from the outer periphery of said plug toward the center thereof, a pipe projecting into said casing at each end thereof and abutting against the adjacent end of the plug and having one or more perforations in its wall, and connections between each of said pipes and the adjacent end of said casing, each of said connections providing with the casing a chamber inclosing the perforation or perforations in the wall of the inclosed pipe.

12. A blow-pipe comprising, in combination, a casing having a discharge outlet nozzle, means for supplying a gas to said nozzle, and means for supplying a second gas to said nozzle, the latter means comprising a plug fitting closely in said casing and having a series of narrow longitudinal slots projecting inwardly from the outer periphery thereof, and a supply conduit for the second gas communicating with said casing and including a casing having therein a plug fitting the latter casing tightly and provided with narrow longitudinal slots projecting inwardly from the outer periphery thereof.

In testimony whereof, I hereunto affix my signature in the presence of two witnesses.

JOHN HARRIS.

Witnesses:
J. B. HULL,
BRENNAN B. WEST.